US007631434B1

(12) United States Patent
Carter, Jr.

(10) Patent No.: US 7,631,434 B1
(45) Date of Patent: Dec. 15, 2009

(54) PLUMB/LEVEL ALIGNMENT GAUGE FOR ALIGNING STRUCTURAL ELEMENTS IN TWO DIRECTIONS

(76) Inventor: William Arthur Carter, Jr., 35 Caswell Ct, East Douglas, MA (US) 01516

( * ) Notice: Subject to any disclaimer, the term of this patent is extended or adjusted under 35 U.S.C. 154(b) by 168 days.

(21) Appl. No.: 11/759,122

(22) Filed: Jun. 6, 2007

(51) Int. Cl.
*G01C 15/02* (2006.01)
*G01C 15/06* (2006.01)
*B25B 11/00* (2006.01)

(52) U.S. Cl. .............................. 33/293; 33/286; 33/299; 33/DIG. 1; 269/8; 248/229.22

(58) Field of Classification Search ................ 33/281, 33/282, 285, 286, 290, 291, 293–296, 299, 33/370, 371, 374, 404, 407, 408, 410, DIG. 1; 248/229.1, 229.12, 229.22; 269/8, 203
See application file for complete search history.

(56) References Cited

U.S. PATENT DOCUMENTS

| | | | | |
|---|---|---|---|---|
| 685,455 | A * | 10/1901 | Kinkead | 33/286 |
| 1,639,561 | A * | 8/1927 | Hargrave | 269/171.5 |
| 3,638,325 | A | 2/1972 | Petrik | |
| 4,621,433 | A | 11/1986 | Takeuchi et al. | |
| 5,001,839 | A * | 3/1991 | Jones | 33/404 |
| 5,233,357 | A | 8/1993 | Ingensand et al. | |
| 5,255,441 | A | 10/1993 | Burgess et al. | |
| 5,584,458 | A * | 12/1996 | Rando | 248/231.41 |
| 5,701,679 | A * | 12/1997 | Buzikievich | 33/293 |
| 5,841,353 | A | 11/1998 | Chisholm et al. | |
| 5,937,531 | A * | 8/1999 | Menk et al. | 33/613 |
| 6,438,854 | B1 * | 8/2002 | Kott, Jr. | 33/286 |
| 6,732,439 | B1 * | 5/2004 | Radke et al. | 33/286 |
| 6,772,526 | B1 * | 8/2004 | Crain et al. | 33/296 |
| 6,834,839 | B1 * | 12/2004 | Wilson | 248/316.6 |
| 7,086,163 | B1 | 8/2006 | Makotinsky | |
| 7,254,895 | B1 * | 8/2007 | O'Donnell | 33/293 |

OTHER PUBLICATIONS

Imtec Group Ltd., On-Line (Web) Catalog, last updated Mar. 20, 2007, downloaded from http://imtecgroup.com/acc1.htm on Jun. 5, 2007.

* cited by examiner

*Primary Examiner*—Amy Cohen Johnson
(74) *Attorney, Agent, or Firm*—Paul E. Lewkowicz P.C.; Paul E. Lewkowicz

(57) ABSTRACT

Described herein are various embodiments of a novel gauge apparatus for rapidly and repeatably attaching a conventional survey target to a structural element in order to facilitate plumb and level alignment and erection. Relatively unskilled workers can use this gauge to set a survey target a predetermined distance from the centerline of the structural element and maintain a consistent registration, thus saving time. The plumb/level alignment gauge consists, in an exemplary embodiment, of a graduated shaft with a target head fitted to receive both a standard surveyor's target and a prism. Attached to the shaft are two sliding jaws that magnetically attach to the structural element. The gauge is positioned by setting the scale mark corresponding to the offset distance directly above the centerline of the column. Plumbing is achieved by aligning the target to the offset line through conventional means.

11 Claims, 6 Drawing Sheets

PLUMB/LEVEL ALIGNMENT GAUGE FOR ALIGNING STRUCTURAL ELEMENTS IN TWO DIRECTIONS

BACKGROUND

In erecting buildings, the surveyor is commonly charged with the task (among other tasks) of ensuring that all of the vertical structural elements are plumb and level, i.e., each vertical element (for example, a column, steel beam, or stud) must be installed so that it is precisely vertical with respect to gravity. In particular, each element must be plumb (vertical) in two directions. These two directions are sometimes referred to as "fore and aft" and "side-to-side" as viewed by a surveyor. In general, however, every structure has a perimeter, referred to herein as the structural envelope. In a simple rectangular plan structure, the envelope has four sides, but obviously there is no limit to the number of edges or even a prohibition on curved edges. Accordingly, the two directions may be generally understood to be "along the structural envelope" and "into the structural envelope," respectively, in buildings of an arbitrary number of sides and curved vertical surfaces.

The typical surveying/erecting process for ensuring verticality or plumbing each structural element includes setting out an offset line parallel to each edge of the building perimeter at a known distance away from the actual building footprint. The offset distance is commonly from two to six feet from the centerline of the structural element, although surveyor's preference and site conditions usually dictate, as will be discussed below. A surveyor positioned at a known point on the offset line next takes a bearing ("shoots a line") along the offset line and adjusts the vertical angle of this line to sight in a target attached to the structural element to be plumbed. The target may be any standard surveying target known to persons having ordinary skill in the art, such as a card target, retroreflector, or prism, and is typically attached (again by well-known means) to a target staff or builder's rod. The rod is typically held perpendicular to the vertical element's centerline and over the offset line by a helper known as the rod man. The target is positioned so that its center point or zero line is at the pre-determined offset distance from the building perimeter.

Since this process can take some time, and because it is unreasonable to expect the rod man to hold the rod perfectly still, the rod or staff is usually clamped to the column or other structural element. However, since the rod cannot be clamped to the column at its vertical center, the survey team must measure the distance from the column's centerline to the optical center of the target in order to ensure that all distance measurements are indexed relative to the vertical centerline of the structural element. These measurements must be made by hand to determine the compensation distances between the center of the column in both the fore-and-aft (along the structural envelope) and side-to-side (into the structural envelope) distances and the position of the target center. The compensation distances thus take into account the space between the target center and the true physical vertical centerline of the structural element. The rod must also be set perpendicular to the vertical center of the column, so that the compensation distance measurements are made on a straight line. This is time consuming and prone to both measurement and mathematical error.

Once the rod is set, the surveyor then directs the erectors to move the column into or out from the plane of the envelope (using conventional building steel erection methods) to plumb it in the lateral or side-to-side direction. Once plumbed in this first direction, the surveyor then measures the distance to the target along the offset line, using common surveying tools such as a theodolite equipped with electronic distance measurement (EDM) hardware and appropriate software. This process is well known in the art and will not be further described. Comparing this distance with the expected fore-and-aft position of the column, adjusted for the compensation distance between the rod's clamped position and the center of the column defined in the building plans, the surveyor then directs the erectors to adjust the column's position fore-and-aft, along the structural envelope.

The whole process is then repeated for the next structural element, and so on, down each edge of the structure and again on each successive floor. The offset distance may be varied to take into account structural or architectural projections (such as cantilevers) extending outside the building envelope or ground conditions (such as traffic) that preclude setting up the theodolite.

Prior art devices include the aforementioned builder's rods with permanent scales or graduations on them, which allow direct positioning to the offset line in the lateral direction. These devices are generally not furnished with clamping devices or other means of attaching them to a structural element. Also known is a magnetic-base target, such as the Sokkia RT50M, which can be directly attached to a steel column or other element. The RT50M, however, measures about four to eight inches from the magnetic base to the center of its retroreflective target and is not adjustable in length beyond a nominal amount. As such, it is too short to reach far enough outside of the building envelope to lie over a typical offset line. The Sokkia RT50M is made by Sokkia Co., Ltd. of 260-63 Hase, Atsugi, Kanagawa, Japan.

Another prior art device once used in the trade consists of a flat plate magnet with a shaft screwed perpendicular to the plane of the plate. Mounted on the shaft is a sliding target that can be positioned along its length. This device is prone to breakage as it can be easily knocked off the face of the column by passing workers, material, or equipment. It has no scale for direct measurement and requires careful setup to measure and compute the compensation distances from column center to target position.

A third prior art device is a tool known as an "erection rod." This device consists of the long arm of a common carpenter's framing square (with its inscribed scale) mounted into a magnet that can be attached to a flat face (i.e., the flange) of a wide web column. A surveyor's target card is positioned on the arm by sliding it along the scale. This device, too, has problems with staying affixed to the steel and it also requires careful setup to measure and compute the compensation distances from column center to target position. Additionally, the target card is prone to blowing off in a stiff wind and movement in general. Furthermore, the whole device has to be rotated to place the target in view of the surveyor.

The deficiencies in the above-described conventional approaches include several sources of error and inaccuracy, potentially contributing to out-of-tolerance measurement accuracy. For example, the rod man must position the rod correctly on each structural element relative to its center and the offset line and measure—again, with high accuracy—the compensation distances from the column center in both the fore-and-aft and side-to-side directions. These offsets must be communicated to the surveyor without error and properly entered into the calculations. The target must also be pointed at the survey instrument, a direction that varies from column to column and floor to floor, which requires careful initial positioning of the entire tool.

What is needed is an adjustable alignment gauge that can be attached to a structural element and positioned rapidly, precisely, and repeatably with respect to the structural element's centerline and an offset line a short distance away from the building envelope.

SUMMARY

Described herein are various embodiments of a novel gauge apparatus for rapidly and repeatably attaching a conventional survey target to a structural element in order to facilitate plumb and level alignment and erection. Relatively unskilled workers can use the disclosed gauge apparatus to set a conventional survey target a predetermined distance from the centerline of the structural element to maintain a consistent registration with the centerline, thus saving labor for the more highly trained rod men and other members of the survey team.

The plumb/level alignment gauge consists, in an exemplary embodiment, of a graduated or otherwise scaled shaft with a target mounting head fitted to receive, on one end, a standard surveyor's target or prism. Attached to the shaft are two sliding jaws that can be clamped or otherwise attached to a structural element. In the case of structural elements made of steel (such as the common steel wide web or I-beam), one exemplary embodiment utilizes magnets on the inside faces of the sliding jaws to attach to the structural element. In some embodiments, the shaft passes through a hole in each jaw that allows the whole shaft to rotate in order to orient the target to a distant surveyor. In an alternate embodiment using a square or rectangular shaft, only the target head rotates around the shaft's long axis.

In operation, the surveyor sets out an offset line parallel to the edge of the building envelope containing the structural elements to be plumbed. (This setting out and use of an offset line is well known in the art and will not be discussed in greater detail herein.) After first establishing a survey plane coincident with and plumb to the offset line, the surveyor acquires the target on the outside end of the plumb/level alignment gauge apparatus. With the target center in view, the surveyor directs the erectors to plumb the structural element by moving it in or out relative to the plane of building envelope, i.e., side-to-side, perpendicular to the survey plane. Once plumb in this "lateral" direction, and using the conventional EDM features of a modern theodolite well known in the art, the surveyor directs the erectors to plumb the column along the plane of the structural envelope, i.e., fore-and-aft, parallel to the survey plane. This latter step is accomplished by comparing the measured distance to the gauge's target against the expected (planned) distance obtained from the building construction plans through standard means well known in the art.

The plumb/level alignment gauge of the present invention is designed to be firmly affixed to a column or other structural element, in one exemplary embodiment by a conventional clamp device well known in the art. In a preferred embodiment, the jaw plates include strong magnets, eliminating the need for an external clamp or clamps.

The shaft portion of the gauge apparatus has a permanently inscribed or otherwise firmly attached graduated scale indexed to the center of the target. This configuration enables the gauge to be directly positioned on a column by setting the scale mark corresponding to the offset distance directly above the centerline of the column. For example, if the offset line is set three feet from the building envelope and the column measures 12×12 inches, the worker simply clamps the gauge to the column and slides the shaft over until the 3-foot mark on the scale is aligned with the column's vertical centerline.

Accordingly, the present plumb/level alignment gauge addresses the shortcomings of the prior art by providing a simple device to plumb structural elements during building erection. The plumb/level alignment gauge is capable of being positioned rapidly, accurately, and repeatably with respect to the centerline and an offset line a short distance away from the building envelope and remains firmly attached.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
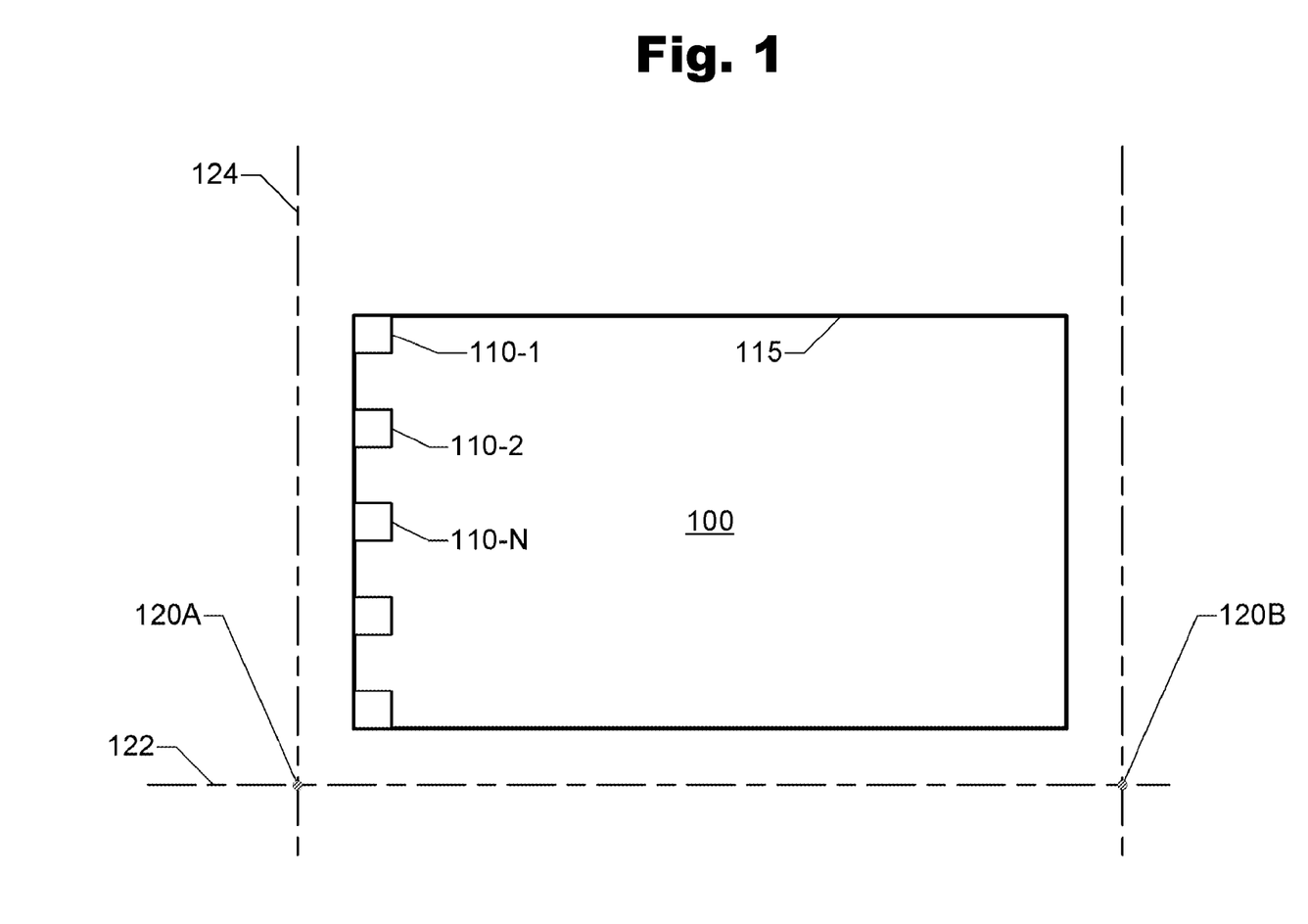
FIG. 1 illustrates, in a simplified plan view, the elements of a building site for reference in subsequent descriptions.

FIG. 1 shows a simplified plan view of a building 100 under construction. At this stage in the construction, several structural elements 110-1, 110-2, and 110-N have been erected and are undergoing the process of plumbing and leveling. In this exemplar, structural envelope 115 is depicted as simple rectangle; clearly, however, a building can have any shape consisting of straight or curved segments of any length or radius. A single, flat side of envelope 115 is discussed herein for simplicity and clarity of illustration. A person having ordinary skill in the art will readily understand that the present invention is not limited in its application to use on any particular building configuration.

Offset lines 122 and 124 are set out by conventional means well-known in the surveyor's art from offset (or coordinate) points 120A and 120B. Other conventional reference points commonly used in the building and surveying trades may also be used.

In order to plumb and level (as those terms are known and used in surveying) structural element 110-N on the side of building 100 parallel to offset line 124, the surveyor positions a theodolite with EDM capabilities (or similar survey instrument) at offset point 120A or at a known distance from offset point 120A on line 124. (The theodolite is omitted from this drawing for clarity; see instead FIG. 2.)

Although a theodolite with EDM capabilities is described, those skilled in the art will realize that an entire class of survey instruments with distance measuring capabilities other than a theodolite can be used, including (for example, but not by way of limitation) a manual or fully-robotic total station. Accordingly, the invention is not limited to any particular type of survey instrument with EDM capabilities. Indeed, one of ordinary skill in the art will also see that a dumpy level or simple transit may also be used to confirm lateral (side-to-side) plumb.

Figure 2:
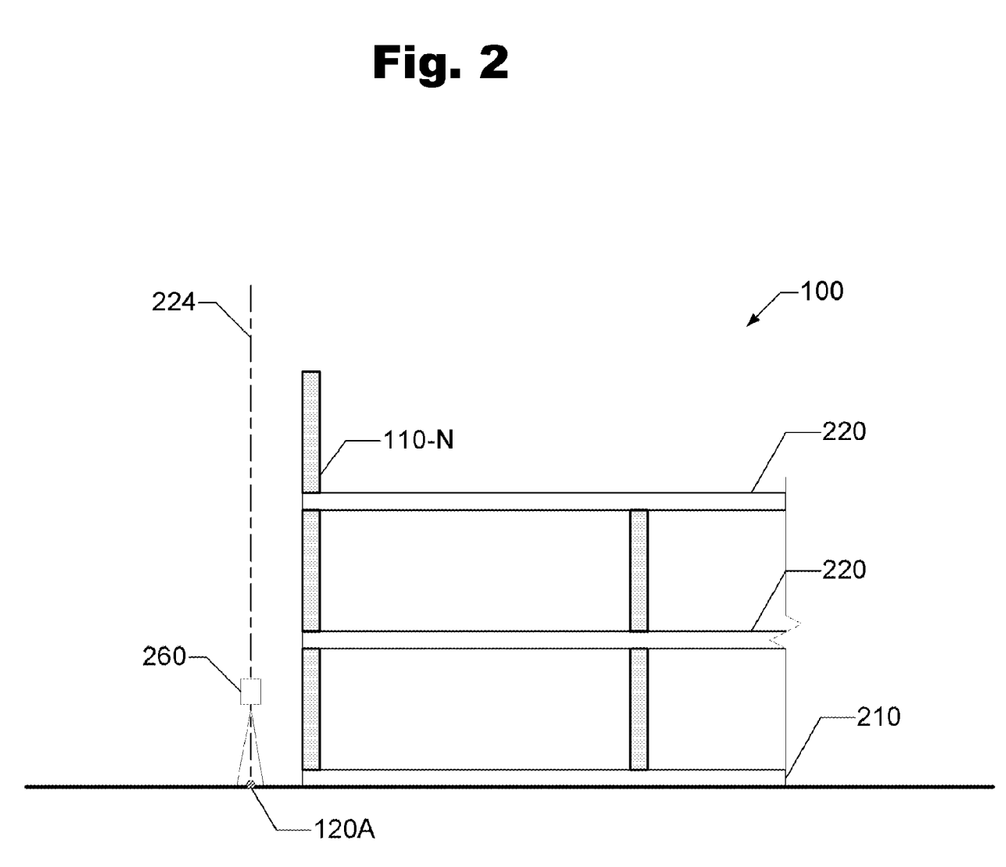
FIG. 2 illustrates, in a simplified elevation view, some of the elements of the building site of FIG. 1 as seen from a surveyor's point of view.

FIG. 2 depicts the surveyor's view of an elevation of building 100. In particular, this drawing highlights a single structural element 110-N in need of alignment with respect to plumb and level as seen from the surveyor's position. This exemplar structural element, here a column or similar building component, is shown on the third floor 220 of a building under construction; one of ordinary skill in the art will recognize that such a column could be on any floor or ground level 210 and still be plumbed with the aid of the present invention. Survey plane 224 is a plumb plane coincident with offset line 124 (which extends into the plane of the drawing in this view) and offset point 120A. Survey plane 224 is established with a survey instrument 260, such as a theodolite or total station, located at offset point 120A.

Figure 3:
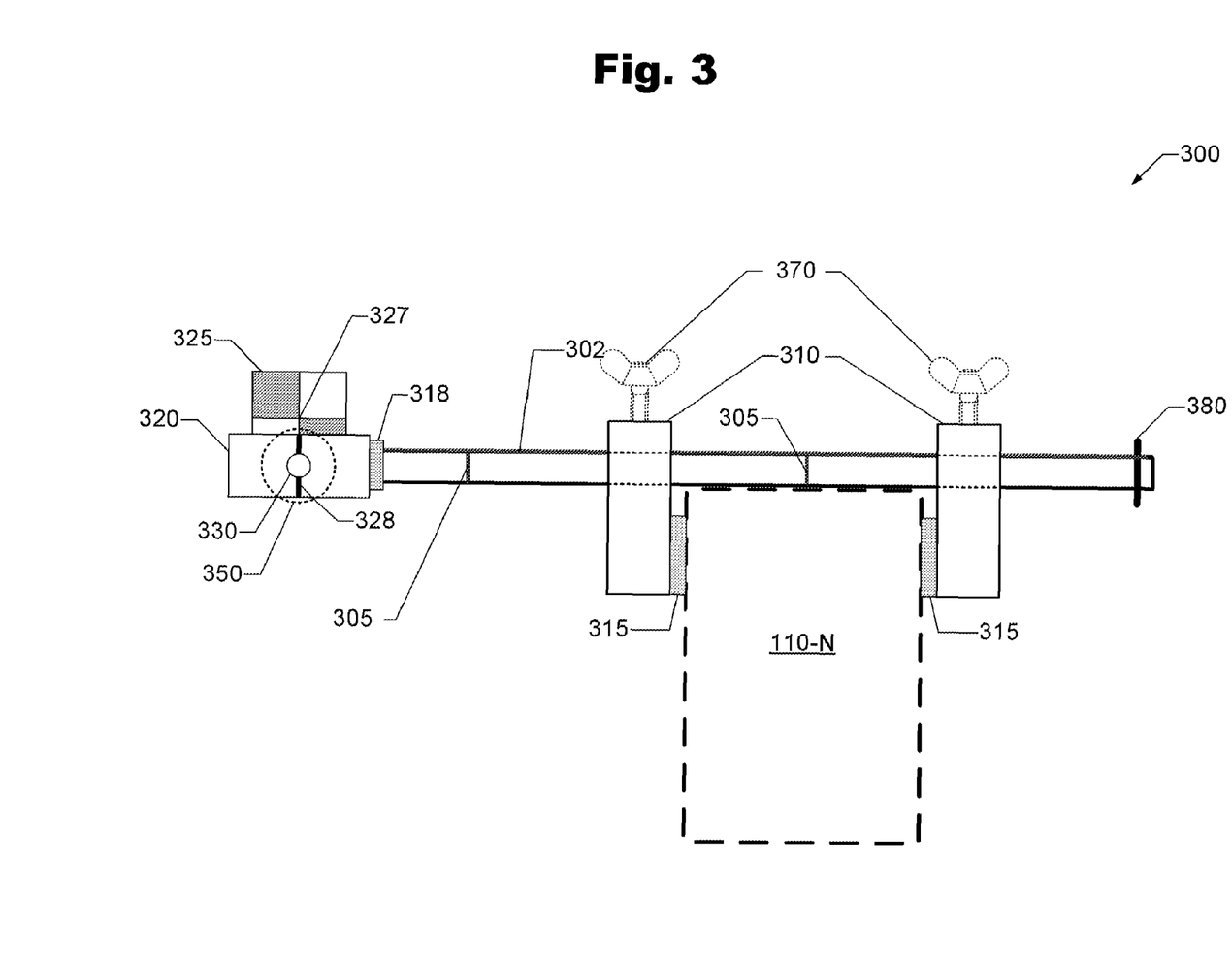
FIG. 3 shows a plumb/level alignment gauge according to one embodiment of the present invention.

FIG. 3 depicts a plumb/level alignment gauge 300 according to one embodiment of the present invention. The gauge comprises a shaft 302 permanently marked with a scale 305. In this figure, scale 305 is depicted as a series of permanently marked lines on shaft 302. Alternately, the markings could be graduations as typically seen on a builder's or surveyor's rod or a level staff commonly used in the art. The scale preferably includes numerical markings that measure the distance from the center point 327 of target 325 in (typically) feet, inches, and tenths (omitted here for illustrative simplicity and clarity).

Shaft 302 may have a round, square, rectangular, or any other cross-section, as long as it is straight along its long axis. Shaft 302 may be made of any material, although steel or another sturdy material is preferred in order to avoid breakage or bending in the harsh environment of the construction jobsite. For example, but not as a limitation, in one embodiment shaft 302 is a standard steel builder's rod, such as a Sokkia Level Rod Model CR-08-T, which has a rectangular cross section and feet and tenths graduations. In another embodiment, shaft 302 is a six-foot length of ¾ inch steel tubing, such as thin-wall conduit.

Furthermore, although an inches and tenths scale is described, those skilled in the art will realize that scales in units other than inches and tenths or feet can be used. Additionally, the scale graduations and numbering may be etched, scribed, cut, painted, or marked onto shaft 302 by any means now known or to be discovered without limitation. Removable scales of any kind may also be used, as long as they can be reliably indexed to an origin or zero point at target center point 327 and read from "0" at center point 327 in ascending order (e.g., 0, 1 meter, 2 meters, etc.) Accordingly, the invention is not limited to any particular scale or method of marking or affixing it to shaft 302.

Jaws 310 are attached to shaft 302 so that they can slide from side-to-side (along the long axis of shaft 302) independently of one another. Jaws 310 may thus be spread apart or slid together to engage the sides of a structural element of any size up to the length of shaft 310. Jaws 310 each have a hole in them to accept shaft 302. The size of the holes in the jaws relative to the outside dimensions of shaft 302 is selected such that the shaft can slide through the jaws (once attached to structural element 110-N) with some slight friction laterally (i.e., along the long axis of shaft 302), but not move appreciably in any other direction, in order to reduce position uncertainty error at target center 327.

In one embodiment, the friction fit of the jaw-shaft interface holds shaft 302 in place. In an alternate embodiment, one or two thumbscrews 370 or similar locking devices commonly employed on a sliding mechanical apparatus may be used to ensure that shaft 302 cannot move relative to jaws 310.

Jaws 310 may contact structural element 110-N directly and be held in place with a convention clamp (such as a common C-clamp or bar clamp, not shown). Preferably, however, jaws 310 are configured to act as backing plates to magnets 315, as shown in FIG. 3 (and in greater detail in the embodiment depicted in FIG. 4). Such magnet-equipped jaws are thus self-attaching, eliminating the need for external clamps.

Shaft 302 is attached to target head 320 in such a way that the target head can be removed for safekeeping and avoidance of damage. In one embodiment, target head 320 has a threaded stud configured to mate with a like-threaded receptacle on the end of shaft 302. In another embodiment, an attachment fitting 318 provides a tight slip fit between shaft 302 and target head 320. The means and method of attachment between target head 320 and shaft 302 are not important to the functioning of the present invention, except that the target head (at least) must be rotable, i.e., able to be rotated to face the surveyor. Whether this is accomplished by means of a rotating attachment fitting 318 or by rotating the entire shaft 302-target head 320 assembly is immaterial. One of ordinary skill in the art will readily see that a wide variety of attachment means are adaptable for use with the present invention and will satisfy the above criteria.

Target head 320 consists, in one exemplary embodiment, of a tubular section, preferably of a durable metal, approximately 6 inches in length with a narrow slot running its length. This slot is sized so that a standard target card 325 (such as but not limited to a Sokkia Model 8126-20 target) can slip tightly into the slot. The slot length is sized so that the zero point 327 of target 325 can be aligned over a zero line 328 inscribed (or otherwise permanently marked) on target holder 320. Alignment of target 325 with zero line 328 is an important step in assembling plumb/level alignment gauge 300 because the horizontal registration of target head 320 with scale 305 is critical to establishing the position of target 325 with respect to the centerline of the structural element 110-N. In one exemplary embodiment, the integrity of scale 305 is ensured by configuring (through means well-known in the manufacturing arts) attachment fitting 318 and target head 320 so that a tight attachment will reliably and repeatably position scale zero line 328 at the true origin of scale 305.

Although a slot running the length of target head 320 and a standard card target 325 are described, those skilled in the art will realize that a variety of slot lengths and common survey targets other than rigid or semi-rigid cards can be used. Stickon, plastic, and metal targets of various shapes and sizes are well known in the art. The slot need not run the full length of the target head either; it need only be long enough to hold the target (of whatever material) firmly. The size of target head 320 and the card-holding slot therein can easily be adapted by a person having ordinary skill in the art to function with the plumb/level alignment gauge described herein. Indeed, one need not install the target in a slot at all; any target fitted to stand above the centerline of rod 302 will work. Accordingly, the invention is not limited to use with any particular type of target.

Target head 320 also includes a prism attachment fitting 330 mounted on scale zero line 328. Fitting 330 is, in one exemplary embodiment, a simple brass disc $7/16$ of an inch in diameter and ⁵⁄₁₆ of an inch thick, drilled through its center and tapped to receive a 6 mm×1.0 thread per mm (also known as M6 x1.0) stud. This type of mounting thread is commonly used on surveyor's mini-prisms and other EDM retro-reflective devices.

Prism attachment fitting 330 must be attached to target head 320 so that its center is set on scale zero line 328. This alignment registers the center of prism 350 with the origin of scale 305, just as the center 327 of target 325 was aligned in the previous embodiment. This alignment represents only one direction, however; it provides a lateral zero reference only. In order to ensure that prism 350 is at a precisely known position in the direction parallel to the survey plane 224 (referencing FIG. 2), prism attachment fitting 330 is mounted so that prism 350's "back" (as the effective reflection surface/point of the prism is referred to in the art) is co-planar with the surface of shaft 302 that contacts the side of structural element 110-N.

Prism 350 (shown in dashed outline for clarity) is, in one exemplary embodiment, a typical surveyor's mini-prism used with EDM devices, such as (for example but not by way of limitation) the OMNI JR. 25.4 mm prism. This prism is equipped with an M6 x1.0 stud that mounts into fitting 330. OMNI JR. Prisms are available from Omni Optical Products, Inc., 17282 Eastman Ave., Irvine, Calif. 92614.

Shaft 302 may also include, in some embodiments, a pin 380 that prevents jaws 310 from sliding off. Other devices, such as a cotter pin, screw-on cap, or flared end on shaft 302 may also be used. Accordingly, the invention is not limited to any particular type of pin 380 or similar part placed to prevent either or both jaws 310 from becoming separated from shaft 302.

Although jaws 310 having an asymmetric cross section (with respect to shaft 302) are illustrated in FIG. 3, those skilled in the art will realize that jaws of any shape can be used. In one embodiment, shown in FIG. 4, jaws 410 consist of circular backing plates 412 for flat toroidal plate magnets 415, where both the jaws and the magnets are in the shape of a flat torus mounted concentric with the long axis of shaft 302. Accordingly, the invention is not limited to any particular jaw and (if employed) magnet shape.

Figure 4:
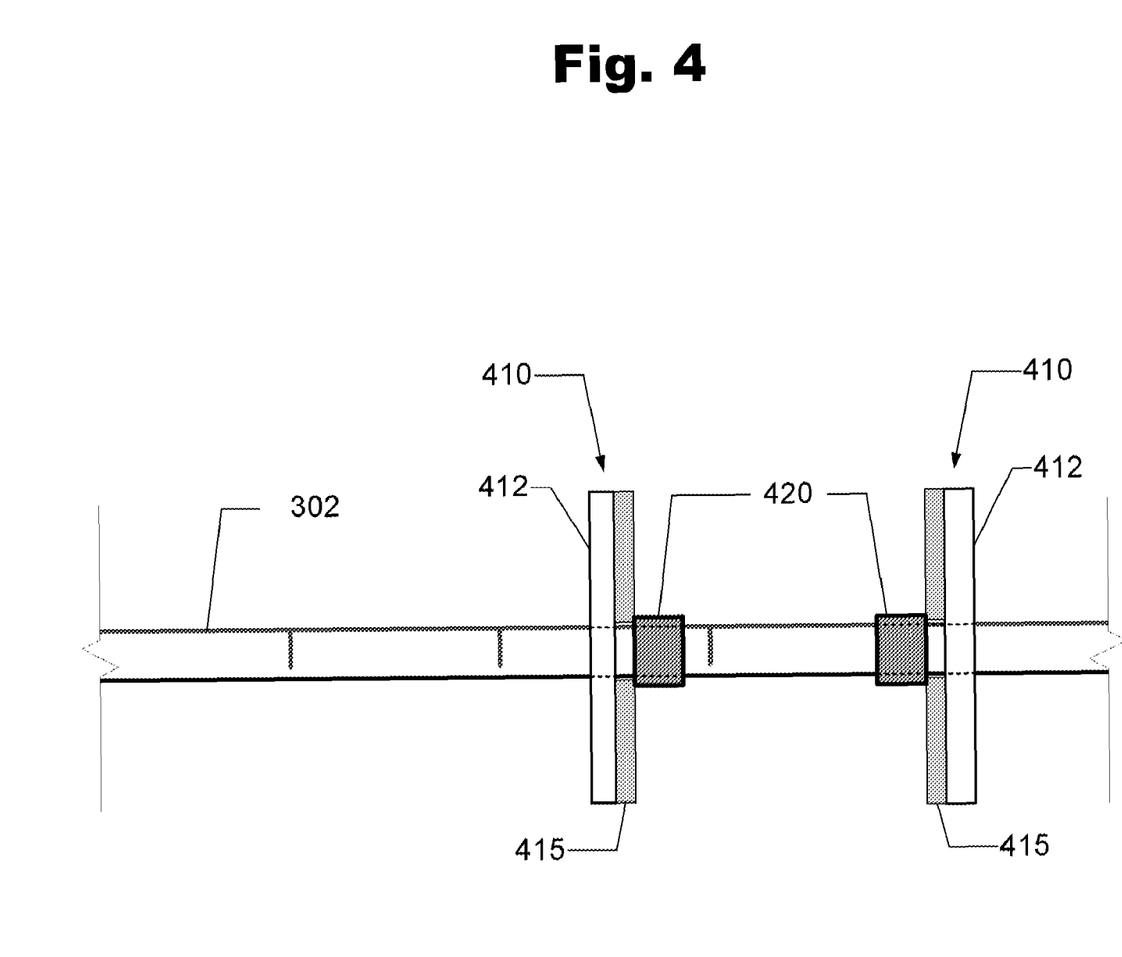
FIG. 4 shows a portion of a plumb/level alignment gauge according to an alternate embodiment of the present invention.

The embodiment depicted in FIG. 4 also includes pinch protection sleeves 420 placed between jaws 410 to prevent magnets 415 from meeting and potentially pinching someone's finger. Besides being painful, strong plate magnets of the type employed here may be extremely difficult to separate once joined by mutual attraction; pinch protection sleeves 420 prevent this occurrence by maintaining a separation of about one inch or more.

Note that the function of pinch protection sleeves 420 may also be accomplished by a single sleeve or by more than two sleeves. Indeed, protection may be equally afforded by, for example, a block or blocks attached to shaft 302 or one or both magnets 415. The only limitation on such pinch protection means is that they do not interfere with the repeatable and precise placement of the plumb/level alignment gauge on the structural element so that the center point of the target (or the effective back of the prism) is at a known and constant position relative to the centerline of the structural element. Accordingly, one of ordinary skill in the art will therefore recognize that the present invention is not limited as to the type or number of pinch protection sleeves.

In the circular-jaw exemplary embodiment of FIG. 4 above, the diameter of jaw backing plate 412 is approximately five inches and employs a five-inch diameter toroidal plate magnet 415 approximately ⅜ of an inch thick. The center hole of each jaw 410 is ¹⁵⁄₁₆ of an inch in diameter and slips over a ¾ inch outside diameter (O.D.) length of standard galvanized electrical conduit (EMT, or Electrical Metallic Tubing) material; the conduit forms shaft 302. The function of pinch protection sleeves 420 is furnished by two half-inch long segments of one inch O.D. conduit slipped over shaft 302 and located between magnets 415. Fitted on the target end of shaft 302 is a standard ¾-to-¾ inch EMT conduit compression coupler (functioning as attachment fitting 318) that allows for rotation and removal of target head 320 and target 325. (The entire shaft 302 is also rotable within the center holes of jaws 410.) Target holder 320 is constructed, in this exemplary embodiment, of a 6-inch length of ¾ inch EMT material with a 4⅛ inch slot cut along its length to receive a Sokkia Model 8126-20 target card. Target holder 320 also includes the simple brass disc prism attachment fitting 330 discussed above and is configured to accept the OMNI JR. prism. In this configuration, the effective back of the prism is coincident with the far end of its mounting stud, which extends ⁵⁄₁₆ of an inch from its body. Accordingly, when this prism is screwed tightly into attachment fitting 330, the end of the stud, and thus the effective back of the prism, is very nearly in contact with the outer diameter of target head 320, offset only by an amount equal to the wall thickness of pinch protection sleeves 420.

Because of this design, the surveyor can be confident that the compensation distance between the back of prism 350 and the centerline of structural element 110-N depends solely on the size of the structural element. When the plumb/level alignment gauge is attached to the far side of structural element 110-N, the compensation distance is subtracted from the line-of-sight distance to the prism; when attached to the near side, the compensation distance (plus the ¾ inch diameter of shaft 302) is added to the line-of-sight distance. The computation of such distances including compensation distances determined by the position of tools is well known and well within the experience of a person having ordinary skill in the art.

Although a particular size of prism attachment fitting 330 is described, those skilled in the art will realize that various attachment fittings sized to mate with industry-standard EDM retro-reflectors of various types can also be used. Accordingly, the invention is not limited to any particular type of fitting (or EDM retro-reflector), so long as fitting can positively register hold an EDM reflector with respect to the scale zero line and structural element contact surface alignment criteria discussed above.

Figure 5A:
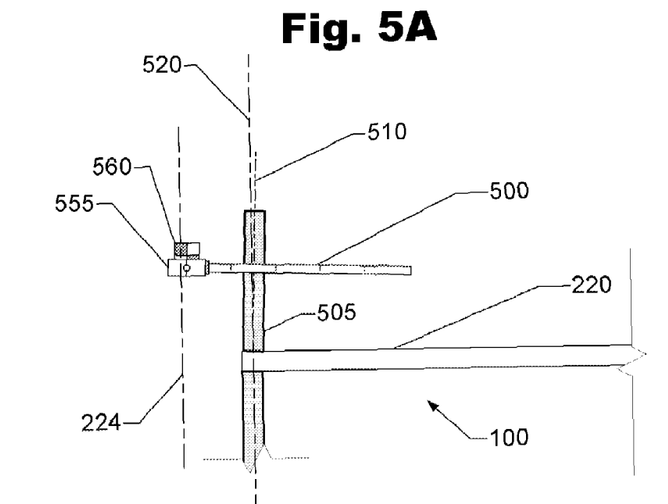
FIG. 5A illustrates a simplified elevation view of the plumb/level alignment gauge in use, according to one embodiment of the present invention.

FIG. 5A shows an expanded view of the building elevation depicted in FIG. 2 with a plumb/level alignment gauge 500 in use. Here, a single vertical structural element 505 is shown for clarity. The vertical centerline 510 of structural element 505 is shown at a slight deviation to plumb line 520 (here exaggerated for illustration purposes). Plumb/level alignment gauge 500 is attached to structural element 505 with target head 555 and target 560 extending outside of the building envelope and nearly (but not quite yet) aligned with survey plane 224. (Survey plane 224, as described above with reference to FIGS. 1 and 2, is a plane containing offset line 124 and parallel to building envelope 115.)

Figure 5B:
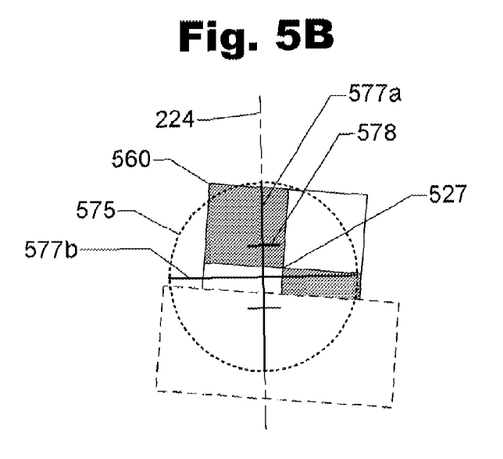
FIG. 5B illustrates a magnified view of target 560 in FIG. 5A, as seen through the theodolite reticle, according to one embodiment of the present invention.

The surveyor's view of target 560 through theodolite reticule 575 prior to plumbing is shown in FIG. 5B. Crosshairs 577a and 577b and stadia 578 are shown for illustrative purposes only, merely to point out the deviation of target center 527 from survey plane 224, which is aligned with the surveyor's vertical crosshair 577a. In this example, the surveyor would first instruct the erectors to level the plumb/level alignment gauge, thus bringing target 560 level. The surveyor would then instruct them to tilt structural element 500 to the surveyor's left to bring it into side-to-side level (i.e., plumb in the direction perpendicular to the survey plane), in accordance with standard methods of plumbing a structural element.

Figure 6:
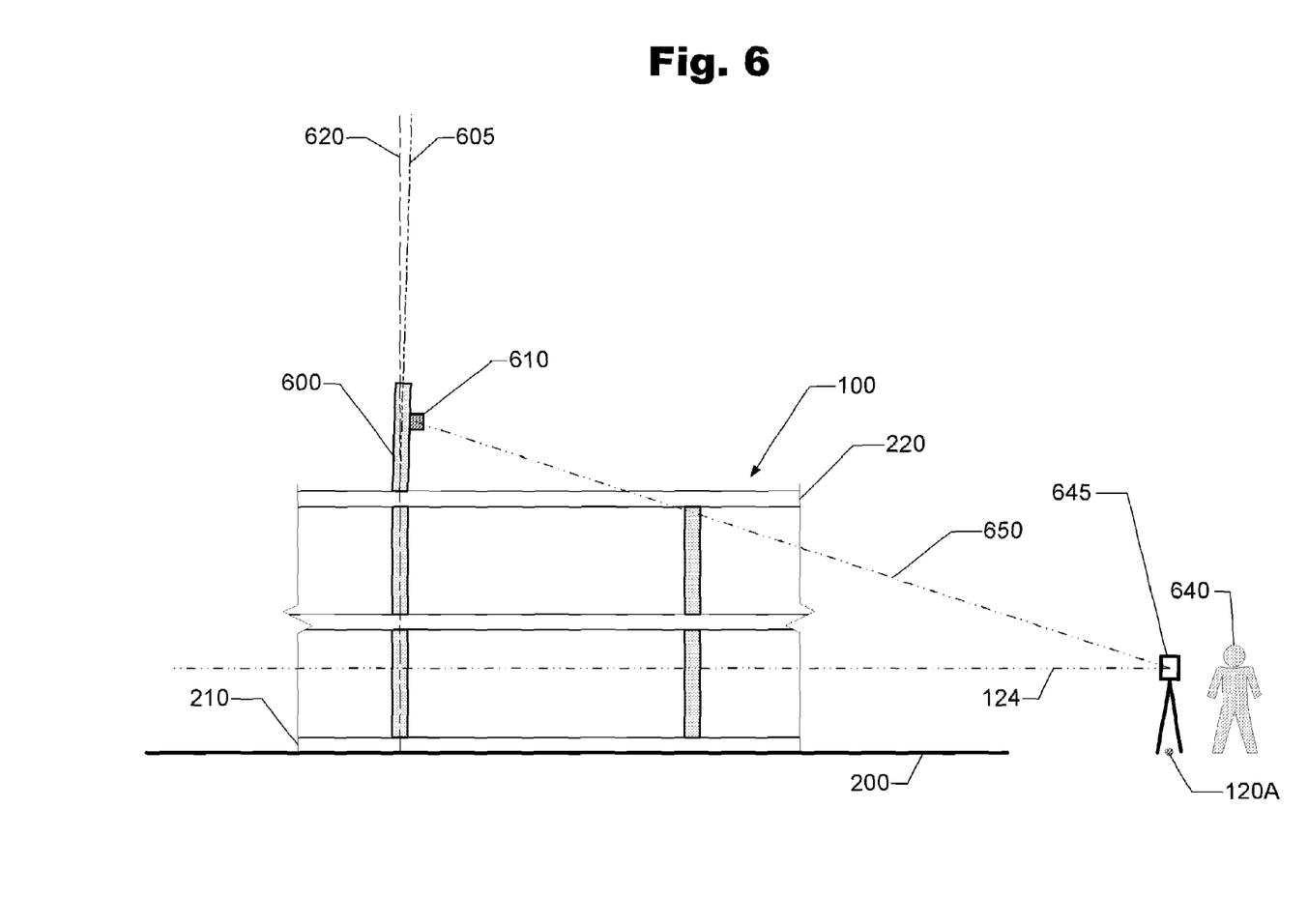
FIG. 6 depicts a simplified elevation view of the plumb/level alignment gauge in use as seen from a point on a line perpendicular to survey plane 224 of FIG. 5A.

A similar process is followed when a prism and EDM device, such as a total station are used: side-to-side (lateral) plumb is determined by simple alignment with the prism's center, as discussed above with respect to target 560 and target center 527 of FIGS. 5A and 5B. Fore-and-aft plumb (i.e., plumb in the direction parallel to the survey plane and perpendicular to lateral plumb) is determined by comparing the measured distance to the effective back of the prism 610 with the expected (computed distance) determined by the building plans. This geometry is illustrated in FIG. 6. Structural element 600 represents the column to be plumbed in the direction parallel to the survey plane. Here, structural element 600 is shown in a portion of building 100 on a floor 220 substantially elevated above foundation 210 in order to accentuate the initial deviation of column centerline 605 from plumb line 620 for illustrative purposes. Surveyor 640 uses a total station 645, for example, to shoot a line 650 in the survey plane defined by offset line 124 to obtain the actual distance to prism target 610. In this example, since structural element 600 is leaning to the right, towards surveyor 640, the distance along line 650 will be shorter than expected for a plumb column. Accordingly, surveyor 640 will instruct the erectors to tilt structural element 600 away from total station 645 until the distance along line 650 matches the expected distance within a standard tolerance appropriate to the conditions.

Distance-based plumb/level computations, such as those necessary to determine the expected distance from the building plans, are well-known in the art and are not further discussed herein.

It must be noted that the present invention can also be used to plumb a vertical structural element in any location where direct viewing is difficult, e.g., the middle column in a long row of columns. One of ordinary skill in the surveying and erection arts will appreciate that many situations can arise beyond the offset line/exterior envelope scenario described for illustrative purposes above. Accordingly, the present invention is not limited in its application to structural elements on a building's perimeter.

Furthermore, the plumb/level alignment gauge presently disclosed may also be used to hold a target at the centerline of a structural element in order to rapidly enable an alignment check from a point perpendicular to the structural envelope and directly in front of the structural element. In one exemplary embodiment, this alignment check may be accomplished by inserting a target into a slot located on shaft 302 between jaws 310 centered, on e.g., the 3-foot mark (referring to FIG. 3). By attaching this plumb/level alignment gauge embodiment and aligning the center of the target so mounted with the centerline of the structural element, the surveyor obtains a quickly and reliably mounted sighting target without the need to transport, calibrate, and mount a separate target device.

While particular embodiments of the present invention have been shown and described, it will be apparent to those skilled in the art that various changes and modifications in form and details may be made therein without departing from the spirit and scope of the invention as defined by the following claims. In particular, the order in which the steps by which the present invention is used is purely illustrative in nature. In fact, the steps can be performed in any order or in parallel, unless otherwise indicated by the present disclosure. Accordingly, the appended claims encompass within their scope all such changes and modifications.

I claim:

1. An apparatus for plumbing a structure having an envelope, comprising:
   a shaft, having a long axis, a proximate end, and a distal end;
   a first and a second jaw moveably attached to said shaft between said proximate end and said distal end;
   a scale permanently marked on said shaft, said scale comprising an origin and a plurality of marks equally spaced along said long axis of said shaft; and
   a target head rotably attached to said proximate end of said shaft, said target head comprising a surveyor's target having a center, wherein said center is aligned with the origin of said scale;
   wherein said jaws allow said apparatus to be attached to a vertical structural element with said shaft held level such that said shaft is laterally adjustable to align a predetermined one of said marks with a vertical centerline of said structural element so that said surveyor's target projects outside said envelope.

2. The apparatus of claim 1, wherein said first and said second jaws each comprise a backing plate and a magnet, said first backing plate oriented toward said proximate end of said shaft on said first jaw and said second backing plate oriented toward said distal end of said shaft on said second jaw.

3. The apparatus of claim 2, wherein at least one of said first and said second jaws further comprises a protection sleeve disposed around said shaft concentric with said long axis and proximate to said magnet on the side opposite said backing plate.

4. The apparatus of claim 2, wherein said jaws are discs moveably attached concentric with said long axis of said shaft.

5. The apparatus of claim 4, wherein said magnet is a toroidal plate magnet.

6. The apparatus of claim 1, wherein said shaft further comprises a pin means adjacent to said distal end disposed so that said jaws cannot slide off of said shaft.

7. The apparatus of claim 1, wherein said shaft is a surveyor's rod.

8. The apparatus of claim 1, wherein said shaft is a length of pipe.

9. The apparatus of claim 1, wherein said target head is removably attached to said shaft.

10. The apparatus of claim 1, wherein said target head comprises a surveyor's retro-reflector.

11. The apparatus of claim 1, wherein said surveyor's target is a stick-on target.

* * * * *